June 13, 1950          L. R. BURGHOFF          2,511,693

ELECTRIC CONNECTING MEANS FOR ELECTRIC COILS

Filed June 24, 1948

Inventor
Louis R. Burghoff
By Seymour, Carler & Nichols
Attorneys

Patented June 13, 1950

2,511,693

UNITED STATES PATENT OFFICE 2,511,693

ELECTRIC CONNECTING MEANS FOR ELECTRIC COILS

Louis R. Burghoff, Forestville, Conn., assignor to The E. Ingraham Company, Bristol, Conn., a corporation of Connecticut Application June 24, 1948, Serial No. 34,867

6 Claims. (Cl. 175—21)

1

The present invention relates to improvements in electric connecting-means and relates more particularly to electric connecting-means for electric coils.

Electric coils, and especially those wound of very fine wire, present a difficult problem with respect to providing for the connection of the delicate terminal-ends of such coils to more rugged connecting-means whereby said coils may be reliably connected to a source of current supply.

Electric coils of the character referred to have many uses in the electrical art, among which uses may be mentioned that of serving as energizing-coils for electric motors and more particularly small synchronous electric motors utilized for driving electric clocks and other instruments.

The terminal-ends of the coils above referred to are ordinarily subjected to breakage as incidents to handling, inspecting, repairing, vibration (especially so when alternating current is used) and the shifting of the coil with respect to its support.

One of the main objects of the present invention is to provide a superior construction and arrangement of parts whereby rugged electric connection may be made to the terminal-ends of electric coils in such manner that breakage of such terminal-ends is minimized despite handling, vibration and the like.

Another object of the present invention is to provide a superior construction and arrangement of parts whereby electric coils of the character referred to may be inspected, tested and handled as a unit with the terminal-ends of its wire securely anchored in place and then readily assembled with a casing or other mounting-means.

A further object of the present invention is to provide a superior construction and arrangement of parts whereby an electric coil may be assembled with a casing or other mounting-means and have its terminal-ends rapidly and effectively electrically connected to rugged and substantially damage-proof conductors extending through such casing or mounting-means.

With the above and other objects in view, as will appear to those skilled in the art from the present disclosure, this invention includes all features in the said disclosure which are novel over the prior art.

In the accompanying drawings, in which certain modes of carrying out the present invention are shown for illustrative purposes:

Fig. 1 is a view mainly in face elevation with part of the closure-plate broken away and part of the insulating guard shown in section;

2

For the purpose of making clear a preferred embodiment of the present invention, a structure has been shown which is suitable for use as a field- or stator-structure for a synchronous electric motor, though available for other electrical uses.

Figure 2:
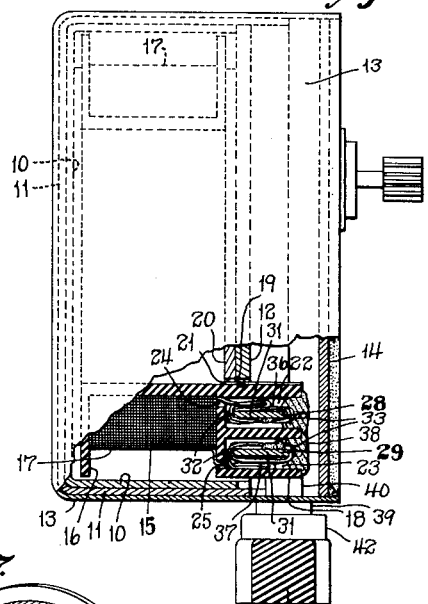
Fig. 2 is a view thereof partly in edge elevation and partly in section on line 2—2 of Fig. 1.

The particular structure illustrated in the accompanying drawings includes a cup-shaped inner shell 10 and a cup-shaped outer shell 11 receiving within it the said inner shell 10, as is indicated in Fig. 2.

The inner shell 10, in the instance shown, is slightly more shallow than the outer shell 11 and has resting upon its edge a plate 12 which, like the shells 10 and 11, is preferably formed of magnetic material such as soft iron, silicon steel or the like.

The elements 10, 11 and 12 are set within a relatively-deep cup-shaped casing or mounting-member 13 in the otherwise open end of which is soldered or otherwise secured a closure-plate 14 spaced remotely from the plate 12 before referred to, as may be observed by references to Fig. 2.

Mounted within the inner shell 10 intermediate the bottom wall thereof and the plate 12 is a coil-unit generally designated by the reference character 15 and including a spool or bobbin 16 and a coil of wire 17 wound in the outer peripheral groove of the said spool. The spool 16 is preferably molded from a suitable synthetic resin having insulating characteristics and includes a holding-lug 18 also formed of insulating material and preferably molded integral with the spool 16. The holding-lug 18 just referred to is, in the instance shown, of rectangular form in cross section and projects outwardly in parallelism with the axis of the said spool from one face of the latter, as is especially well shown in Fig. 7.

The plate 12, which acts as a closure for the rear end of the inner shell 10, is formed with a clearance-notch 19 through which the holding-lug 18 projects. Interposed between the inner face of the transverse plate 12 and the adjacent face of the spool 16 is a plate 20 which may be formed of copper and utilized as a shading-plate in the event that it is desired to employ the structure in conjunction with a shaded-pole electric motor. The said plate 20 is also formed with a clearance-notch 21 through which the holding-lug 18 may project, as shown.

Leading inwardly from the outer face of the holding-lug 18 toward the spool 16 are two recesses or passages 22 and 23 extending in parallelism with each other and arranged in substantial alignment with each other in a radial direction. Leading inwardly from the bottom of the recess 22 in the holding-lug 18 to the peripheral groove of the spool 16 is a wire-receiving passage 24. In a similar manner, there is provided a wire-receiving passage 25 leading from the bottom of the recess 23 to the peripheral groove of the spool 16.

The holding-lug 18 is also formed with two blade-receiving slots 26 and 27 which respectively intersect, in a substantially diametrical direction, the recesses 22 and 23. Each of the said slots also intersects the outer face of the holding-lug 18 as well as each of the respective opposite side walls thereof. It will further be noted that, as is preferred, each of the blade-receiving slots 26 and 27 just referred to extends obliquely or diagonally with respect to a radial line drawn from the center of the coil-unit 15, all for purposes as will more fully hereinafter appear.

Mounted in the blade-receiving slot 26 and the adjacent recess 22 above referred to, is a contact-plate generally designated by the reference character 28. Mounted jointly in the blade-receiving slot 27 and its adjacent recess 23 is a contact-plate corresponding to the contact-plate 28 but generally designated by the reference character 29. The contact-plates just referred to are preferably formed of spring-metal and each includes a contact-arm 30 and a stabilizing-arm 31 integral with and projecting substantially perpendicular with respect to the said contact-arm.

Each of the contact-plates 28 and 29 above referred to is preferably so proportioned in thickness as to snugly fit into a given one of the blade-receiving slots 26 or 27, and each of the contact-plates has its stabilizing-arm 31 proportioned to snugly fit into the adjacent one of the recesses 22 or 23 of the holding-lug 18.

Figure 5:
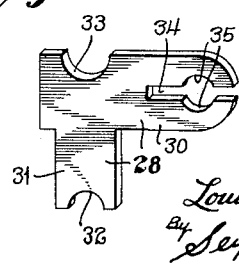
Fig. 5 is a perspective view of one of the two corresponding contact-plates detached.

The inner end of the stabilizing-arm 31 of each contact-plate 28 and 29 is formed with a notch 32 which is aligned with a similar notch 33 formed in the outer edge of the contact-plate, as is especially well shown in Fig. 5. The outer end of the contact-arm 30 of each of the contact-plates 28 and 29 is bifurcated by being provided with a slot 34. The opposite walls of each slot 34 are respectively provided with opposed notched 35—35 to snugly receive a contact-prong, in a manner as well hereinafter appear.

The respective opposite terminal-ends 36 and 37 of the coil of wire 17 are stripped of enamel or other insulating material and are respectively wound around the contact-plates 28 and 29 through the notches 32 and 33 therein prior to the insertion of the said contact-plates into the respective recesses and slots in the holding-lug 18. Preferably, also, the said terminal-ends are soldered to their respective contact-plates. Preferably, after the terminal-ends 36 and 37 have been respectively connected to the contact-plates 28 and 29 and the latter installed in the holding-lug 18, the outer ends of the recesses 22 and 23 are sealed by a body 38 of synthetic resin-cement or the like.

Riveted or otherwise rigidly secured to the lateral wall of the casing or mounting-member 13 are two spaced-apart collars 39—39 through each of which is extended one of two similar tubular necks 40—40 formed integral with an insulating-guard 41 which is preferably molded from synthetic resin.

Figure 3:
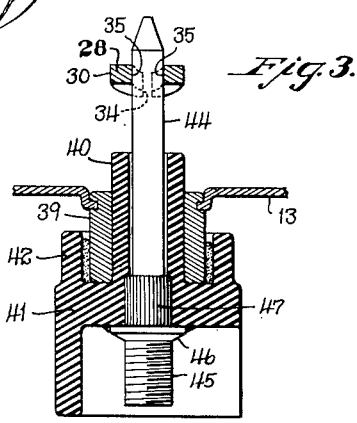
Fig. 3 is a broken sectional view taken on the line 3—3 of Fig. 1, but on a larger scale.
Figure 6:
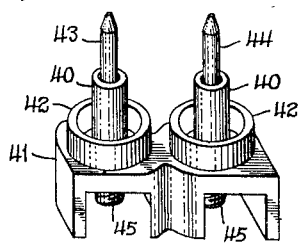
Fig. 6 is a perspective view of the unit comprising the insulating guard with its two contact-prongs assembled therewith.

The insulating-guard 41 above referred to is formed on its inner face with two integral cuffs 42—42 respectively fitting over the exterior of the outer end of the collars 39—39 on the casing 13, as is especially well shown in Fig. 3. The said collars are preferably cemented in place, as is indicated in the figure last referred to.

Mounted in the insulating-guard 41 and respectively extending through the necks 40—40 thereof are two similar contact-prongs 43 and 44 each pointed at its inner end and respectively adapted to be extended into the notches 35—35 in the respective contact-arms 30—30 of the contact-plates 28 and 29. The said contact-prongs are preferably formed of spring-metal and the diameters of their inner portions are preferably such that in being forced into the notches 35—35, the metal of the contact-arms 30 will be sprung to thus insure a certain electrical connection.

Each contact-prong 43 and 44 is formed at its outer end with a threaded portion 45 forming, in effect, a binding-post to which suitable exterior connections may be made to a source of electric current. At the base of its threaded portion 45, each contact-prong is provided with an annular stop-flange 46 seated against the adjacent face of the insulating-guard 41 and preferably cemented thereto. Inwardly of its stop-flange 46, each contact-prong is formed with an annular series of longitudinal serrations 47 which are forced into the material of the insulating-guard, to thus hold each contact-prong against rotation.

Figure 7:
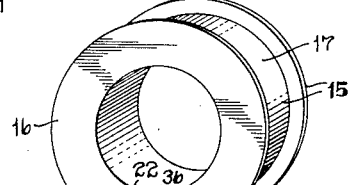
Fig. 7 is a perspective view on a reduced scale of the coil-unit with its two contact-plates assembled therewith but with the recess-sealing cement omitted.
Figure 4:
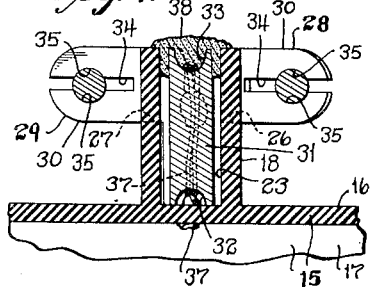
Fig. 4 is a broken sectional view taken on the line 4—4 of Fig. 1, but on substantially the same scale as Fig. 3.

In assembling the structure illustrated in the accompanying drawings, the coil-unit 15 may be completely assembled to the condition in which it is illustrated in Fig. 7 by wrapping the terminal-ends 36 and 37 of the coil of wire 17 respectively about the contact-plates 28 and 29 and soldering the said terminal-ends in place prior to the insertion of the said contact-plates into their respective recesses and slots 22—26 and 23—27. The said contact-plates 28 and 29 may now be respectively installed in their complemental recesses 22—26 and 23—27 during which operation, the surplus length of the terminal-ends 36 and 37 will be readily accommodated within the recesses 22 and 23. Following the installation as just described, the body of cement 38 may be applied jointly over the otherwise open ends of the said recesses 22 and 23, as indicated especially well in Figs. 1 and 2.

Figure 1:
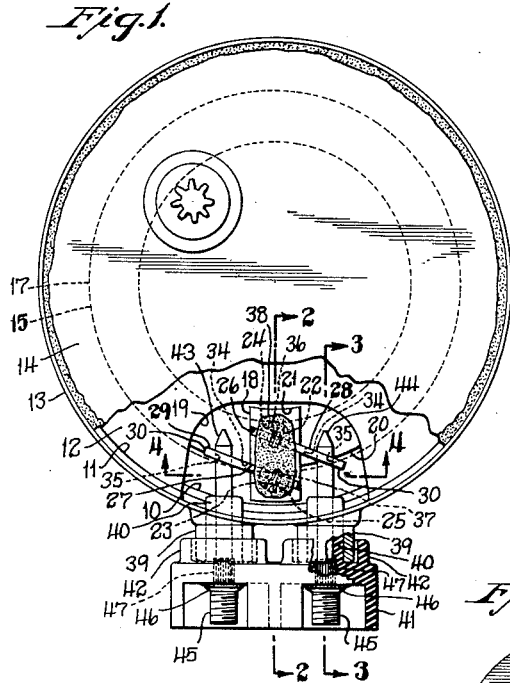

It will be noted by reference to Figs. 1 and 7 that due to the fact that the respective contact-arms 30 of the contact-plates 28 and 29 extend obliquely or diagonally with respect to a radial line drawn from the center of the coil-unit 15, the respective notches 35—35 of each of the said contact-plates are located in substantial circumferential alignment.

The units comprising the insulating-guard 41 and its two contact-prongs 43 and 44 may also be assembled together.

Under the conditions above described, the coil-unit 15, in the condition illustrated in Fig. 7, may be installed within the inner shell 10, as indicated in Figs. 1 and 2, following which the plates 20 and 12 may be installed, together with the closure-plate 14. Following the coating of the interiors of the cuffs 42—42 of the insulating-guard with a suitable cement, the said insulating-guard may be slipped over the collars 39—39 of the casing 13 or other mounting-member so that the inner ends of the laterally-yielding contact-prongs 43 and 44 are entered into the respective opposed notches 35—35 of the contact-plates 28 and 29 to afford an effective electrical connection. As soon as the cement above described has set, the insulating-guard 41 and the parts carried thereby will, in effect, become a unitary feature of the casing 13, thus providing an electrical connection between the coil of wire 17 and the exterior of the structure, which connection is tight against moisture, oil or the like.

Due to the oblique or diagonal arrangement of the contact-arms 30 of each of the contact-plates 28 and 29, the insulating-guard 41 and its contact-prongs 43 may be installed, as preferred, with either face upward.

When the parts are assembled as above described, not only will an effective and rugged electrical connection be provided for the slender terminal-ends 36 and 37, but the contact-prongs 43 and 44 will serve to physically stabilize the coil-unit 15.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A coil-unit including in combination: a coil-supporting ring bobbin having a flange projecting outwardly beyond the periphery of its body and having a unitary lug offsetting from the outer face of the said flange; a coil of wire mounted upon the said bobbin and having two terminal-ends; and a pair of substantially-parallel complementary contact-plates extending in face-to-face spaced-apart relationship and each having an inner end secured to the said lug and an outer end projecting freely away from a side of the said lug in a direction opposite to the outer end of the other of said contact-plates and in a diagonal direction with respect to a radial line drawn through the said lug from the center of the said bobbin, and each contact-plate having a prong-engaging means in its said projecting outer end and located in substantially-circumferential alignment with the similar means of the other of said contact-plates; and the terminal-ends of the said coil being respectively electrically connected to the said contact-plates.

2. A coil-unit including in combination: a coil-supporting ring bobbin having a flange projecting outwardly beyond the periphery of its body and having a unitary lug offsetting from the outer face of the said flange; a coil of wire mounted upon the said bobbin and having two terminal-ends; and a pair of substantially-parallel complementary contact-plates extending in face-to-face spaced-apart relationship and each having an inner end secured to the said lug and an outer end projecting freely away from a side of the said lug in a direction opposite to the outer end of the other of said contact-plates and in a diagonal direction with respect to a radial line drawn through the said lug from the center of the said bobbin and each contact-plate having a prong-receiving opening in its said projecting outer end and located in substantially-circumferential alignment with the similar opening of the other of said contact-plates; and the terminal-ends of the said coil being respectively electrically connected to the said contact-plates.

3. A coil-unit including in combination: a coil-supporting ring bobbin having a flange projecting outwardly beyond the periphery of its body and having a unitary lug offsetting from the outer face of the said flange; a coil of wire mounted upon the said bobbin and having two terminal-ends, the said lug being provided with two substantially-parallel contact-holding slots extending in face-to-face spaced-apart relationship respectively in planes substantially perpendicular with respect to the outer face of the said flange and also in a diagonal direction with respect to a radial line drawn through the said lug from the center of the said bobbin; a pair of substantially-parallel complemental contact-plates extending in face-to-face spaced-apart relationship respectively in the said contact-holding slots, each of the said contact-plates having its inner end secured in the said lug and having an outer end projecting freely away from a side of the said lug in a direction opposite to the similar end of the other of said contact-plates and in a diagonal direction with respect to a radial line drawn through the said lug from the center of the said bobbin, and each of the said contact-plates having prong-engaging means in its said projecting outer end and located in substantially-circumferential alignment with the similar means of the other of said contact-plates; the terminal-ends of the said coil being respectively electrically connected to the said contact-plates.

4. A coil-unit including in combination: a coil-supporting ring bobbin having a flange projecting outwardly beyond the periphery of its body and having a unitary lug offsetting from the outer face of the said flange; a coil of wire mounted upon the said bobbin and having two terminal-ends, the said lug being provided with two substantially-parallel contact-holding slots extending in face-to-face spaced-apart relationship respectively in planes substantially perpendicular with respect to the outer face of the said flange and also in a diagonal direction with respect to a radial line drawn through the said lug from the center of the said bobbin; a pair of substantially-parallel complemental contact-plates extending in face-to-face spaced-apart relationship respectively in the said contact-holding slots, each of the said contact-plates having its inner end secured in the said lug and having a bifurcated outer end projecting freely away from a side of the said lug in a direction opposite to the similar end of the other of said contact-plates and in a diagonal direction with respect to a radial line drawn through the said lug from the center of the said bobbin, and each of the said contact-plates having its said bifurcated projecting outer end located in substantially-circumferential alignment with the similar end of the other of said contact-plates; the terminal-ends of the said coil being respectively electrically connected to the said contact-plates.

5. A coil-unit including in combination: a coil-supporting ring bobbin having a flange projecting outwardly beyond the periphery of its body and having a unitary lug offsetting from the outer face of the said flange; a coil of wire mounted upon the said bobbin and having two terminal-ends, the said lug being provided with two substantially-parallel contact-holding slots extending in face-to-face spaced-apart relationship respectively in planes substantially perpendicular with respect to the outer face of the said flange and also in a diagonal direction with respect to a radial line drawn through the said lug from the center of the said bobbin; a pair of substantially-parallel complemental contact-plates of L-shaped form extending in face-to-face spaced-apart relationship respectively in the said contact-holding slots, each of the said contact-plates having one of the arms of its L-shaped form secured in one of the said slots and having its outer arm projecting freely away from a side of the said lug in a direction opposite to the similar arm of the other of said contact-plates and in a diagonal direction with respect to a radial line drawn through the said lug from the center of the said bobbin, and each of the said contact-plates having prong-engaging means in its said projecting arm and located in substantially-circumferential alignment with the similar means of the other of said contact-plates; the terminal-ends of the said coil being respectively electrically connected to the said contact-plates.

6. A coil-unit including in combination: a coil-supporting ring bobbin having a flange projecting outwardly beyond the periphery of its body and having a unitary lug offsetting from the outer face of the said flange; a coil of wire mounted upon the said bobbin and having two terminal-ends, the said lug being provided with two substantially-parallel contact-holding slots extending in face-to-face spaced-apart relationship respectively in planes substantially perpendicular with respect to the outer face of the said flange and also in a diagonal direction with respect to a radial line drawn through the said lug from the center of the said bobbin; a pair of substantially-parallel complemental contact-plates of L-shaped form extending in face-to-face spaced-apart relationship respectively in the said contact-holding slots, each of the said contact-plates having one of the arms of its L-shaped form secured in one of the said slots and having its other arm bifurcated and projecting freely away from a side of the said lug in a direction opposite to the similar arm of the other of said contact-plates and in a diagonal direction with respect to a radial line drawn through the said lug from the center of the said bobbin, and each of the said contact-plates having a prong-receiving opening in its said bifurcated projecting outer end located in substantially-circumferential alignment with the similar end of the other of said contact-plates; the terminal-ends of the said coil being respectively electrically connected to the said contact-plates.

LOUIS R. BURGHOFF.

REFERENCES CITED

The following references are of record in the file of this patent:

UNITED STATES PATENTS

| Number | Name | Date |
| --- | --- | --- |
| 1,014,780 | Smith | Jan. 16, 1912 |
| 1,365,170 | Gowen | Jan. 11, 1921 |
| 1,553,952 | Nero | Sept. 15, 1925 |
| 1,577,794 | Elliott | Mar. 23, 1926 |
| 1,873,658 | Murdock | Aug. 23, 1932 |
| 1,997,198 | Ogg | Apr. 9, 1935 |
| 2,100,009 | Hardy | Nov. 23, 1937 |
| 2,238,740 | Lazich | Apr. 15, 1941 |
| 2,243,063 | Arey | May 27, 1941 |

FOREIGN PATENTS

| Number | Country | Date |
| --- | --- | --- |
| 52,684 | Netherlands | June 15, 1942 |